(12) United States Patent
Batchelder et al.

(10) Patent No.: US 8,439,665 B2
(45) Date of Patent: May 14, 2013

(54) RIBBON LIQUEFIER FOR USE IN EXTRUSION-BASED DIGITAL MANUFACTURING SYSTEMS

(75) Inventors: J. Samuel Batchelder, Somers, NY (US); William J. Swanson, St. Paul, MN (US); S. Scott Crump, Wayzata, MN (US)

(73) Assignee: Stratasys, Inc., Eden Prairie, MN (US)

( * ) Notice: Subject to any disclaimer, the term of this patent is extended or adjusted under 35 U.S.C. 154(b) by 515 days.

(21) Appl. No.: 12/612,329

(22) Filed: Nov. 4, 2009

(65) Prior Publication Data

US 2011/0074065 A1 Mar. 31, 2011

Related U.S. Application Data

(60) Provisional application No. 61/247,068, filed on Sep. 30, 2009.

(51) Int. Cl.
*B29C 41/22* (2006.01)

(52) U.S. Cl.
USPC .......................... 425/144; 425/145; 425/375

(58) Field of Classification Search .......... 425/375, 425/113, DIG. 17, 97, 144, 145, 162; 264/75, 264/245, 255, 308; 700/119
See application file for complete search history.

(56) References Cited

U.S. PATENT DOCUMENTS

| 4,113,935 A | 9/1978 | Schippers et al. |
| 4,614,488 A * | 9/1986 | Sigerist ........................... 425/233 |
| 4,639,155 A | 1/1987 | Schuster et al. |
| 4,749,347 A | 6/1988 | Valavaara |
| 4,797,313 A | 1/1989 | Stolk et al. |
| 5,121,329 A | 6/1992 | Crump |
| 5,169,081 A | 12/1992 | Goedderz |
| 5,303,141 A | 4/1994 | Batchelder et al. |
| 5,312,224 A | 5/1994 | Batchelder et al. |
| 5,340,433 A | 8/1994 | Crump |

(Continued)

FOREIGN PATENT DOCUMENTS

| GB | 816016 | 7/1959 |
| GB | 2 291 003 A | 1/1996 |
| WO | 97/37810 | 10/1997 |

OTHER PUBLICATIONS

Techspan Group, "Technical Data Sheet—Techspan Plastic Welding Rods", dated Dec. 31, 2007, retrieved from URL:http://www.techspanonline.com/data/media/documents/pdf/7.%20TechspanRodList2007.pdf, retrieved Nov. 4, 2010.

(Continued)

*Primary Examiner* — Yogendra Gupta
*Assistant Examiner* — Emmanuel S Luk
(74) *Attorney, Agent, or Firm* — Brian R. Morrison; Westman, Champlin & Kelly, P.A.

(57) ABSTRACT

A ribbon liquefier comprising an outer liquefier portion configured to receive thermal energy from a heat transfer component, and a channel at least partially defined by the outer liquefier portion, where the channel has dimensions that are configured to receive the ribbon filament, and where the ribbon liquefier is configured to melt the ribbon filament received in the channel to at least an extrudable state with the received thermal energy to provide a melt flow. The dimensions of the channel are further configured to conform the melt flow from an axially-asymmetric flow to a substantially axially-symmetric flow in an extrusion tip connected to the ribbon liquefier.

20 Claims, 9 Drawing Sheets

U.S. PATENT DOCUMENTS

| | | | |
|---|---|---|---|
| 5,342,687 A | 8/1994 | Iwai et al. | |
| 5,503,785 A | 4/1996 | Crump et al. | |
| 5,738,817 A | 4/1998 | Danforth et al. | |
| 5,764,521 A * | 6/1998 | Batchelder et al. | 700/196 |
| 5,866,058 A | 2/1999 | Batchelder et al. | |
| 5,939,008 A | 8/1999 | Comb et al. | |
| 5,968,561 A | 10/1999 | Batchelder et al. | |
| 6,004,124 A | 12/1999 | Swanson et al. | |
| 6,022,207 A | 2/2000 | Dahlin et al. | |
| 6,054,077 A | 4/2000 | Comb et al. | |
| 6,067,480 A | 5/2000 | Stuffle et al. | |
| 6,070,107 A | 5/2000 | Lombardi et al. | |
| 6,085,957 A | 7/2000 | Zinniel et al. | |
| 6,129,872 A | 10/2000 | Jang | |
| 6,228,923 B1 | 5/2001 | Lombardi et al. | |
| 6,257,517 B1 | 7/2001 | Babish et al. | |
| 6,302,309 B1 | 10/2001 | Drader | |
| 6,547,995 B1 | 4/2003 | Comb | |
| 6,645,412 B2 | 11/2003 | Priedeman, Jr. | |
| 6,685,866 B2 | 2/2004 | Swanson et al. | |
| 6,722,872 B1 | 4/2004 | Swanson et al. | |
| 6,730,252 B1 | 5/2004 | Teoh et al. | |
| 6,749,414 B1 | 6/2004 | Hanson et al. | |
| 6,790,403 B1 | 9/2004 | Priedeman, Jr. et al. | |
| 6,814,907 B1 | 11/2004 | Comb | |
| 6,869,559 B2 | 3/2005 | Hopkins | |
| 6,923,634 B2 | 8/2005 | Swanson et al. | |
| 6,998,087 B1 | 2/2006 | Hanson et al. | |
| 7,122,246 B2 | 10/2006 | Comb et al. | |
| 7,172,715 B2 | 2/2007 | Swanson et al. | |
| 7,363,686 B2 | 4/2008 | Fukuyasu et al. | |
| 8,040,784 B2 * | 10/2011 | Gierak et al. | 369/126 |
| 8,226,395 B2 * | 7/2012 | Pax et al. | 425/174.4 |
| 2007/0003656 A1 | 1/2007 | LaBosiee et al. | |
| 2007/0228590 A1 | 10/2007 | LaBossiere et al. | |
| 2009/0035405 A1 | 2/2009 | Leavitt | |
| 2009/0263582 A1 | 10/2009 | Batchelder | |
| 2009/0273122 A1 | 11/2009 | Batchelder | |
| 2009/0274540 A1 | 11/2009 | Batchelder | |

OTHER PUBLICATIONS

Search Report and Written Opinion dated Nov. 19, 2010 from International Application No. PCT/US2010/049604.

Examiner's Report from Canadian Patent Office dated Nov. 26, 2012 for Canadian Patent Application No. 2,775,071.

* cited by examiner

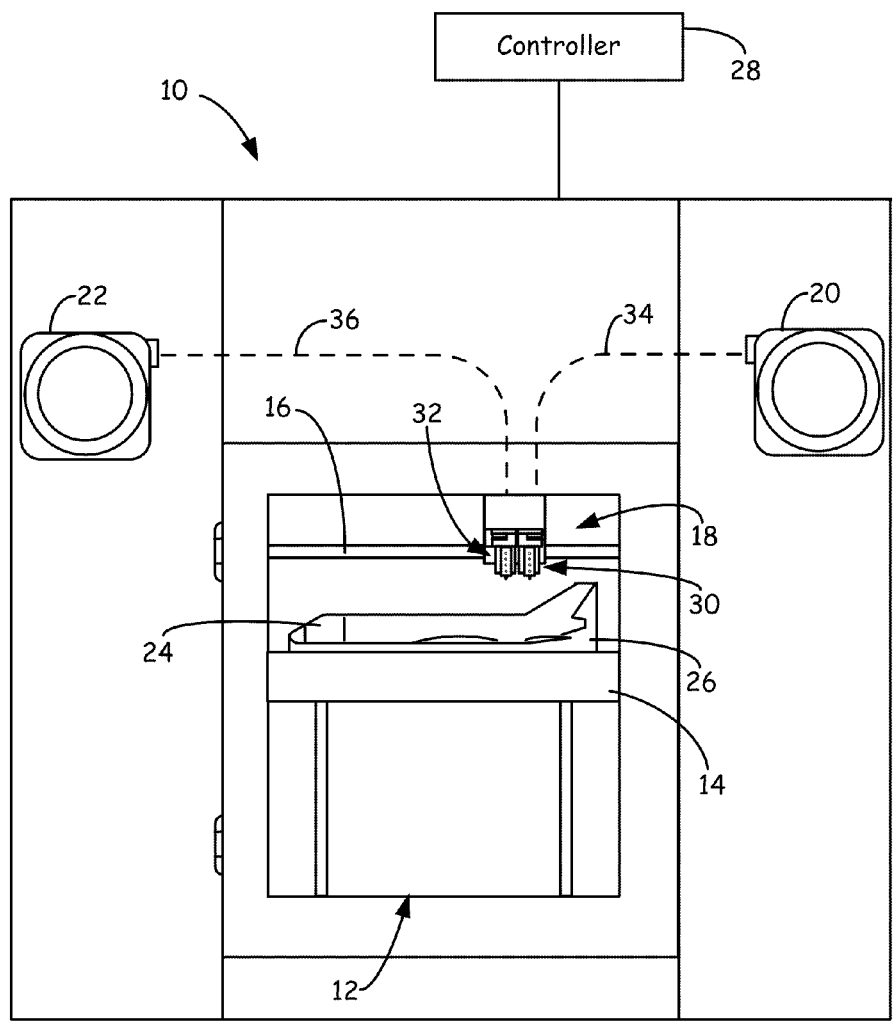
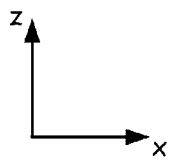
FIG. 1

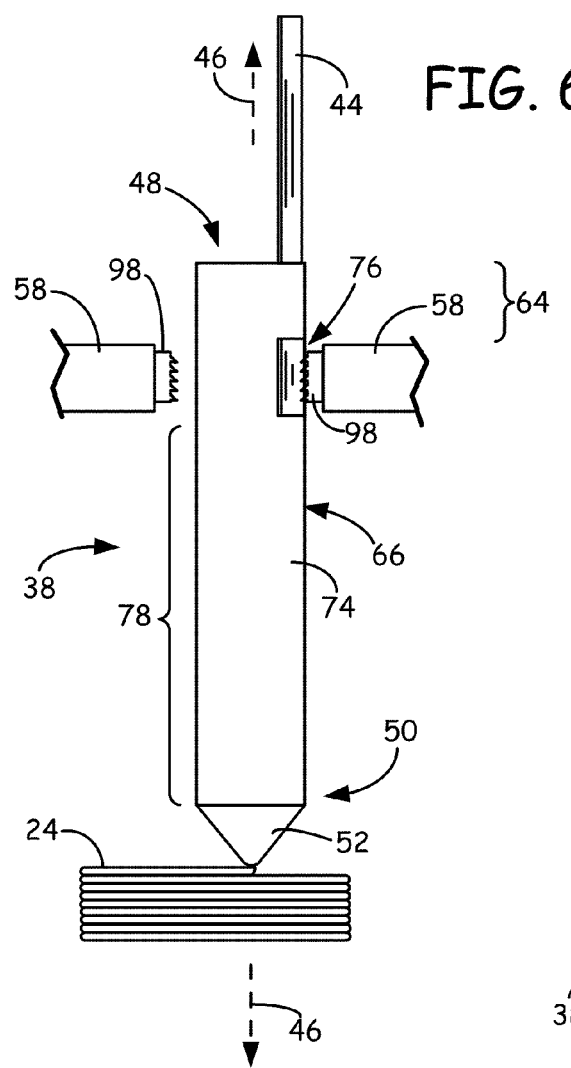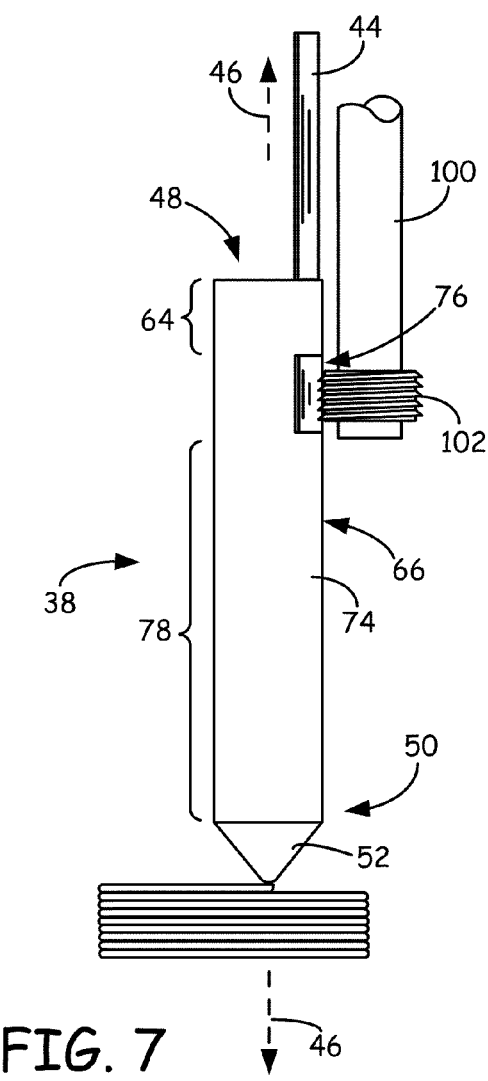

RIBBON LIQUEFIER FOR USE IN EXTRUSION-BASED DIGITAL MANUFACTURING SYSTEMS

CROSS-REFERENCE TO RELATED APPLICATION(S)

This application claims priority to U.S. Provisional Patent Application No. 61/247,068, filed on Sep. 30, 2009, and entitled "Ribbon Liquefier For Use In Extrusion-Based Digital Manufacturing Systems".

Reference is hereby made to U.S. patent application Ser. No. 12/612,333, filed on even date, and entitled "Non-Cylindrical Filament For Use In Extrusion-Based Digital Manufacturing Systems", which published as U.S. Provisional Patent Application Publication No. 2011/0076496, and which claims priority to U.S. Provisional Patent Application No. 61/247,067, filed on Sep. 30, 2009.

Reference is also hereby made to U.S. patent application Ser. No. 12/612,342, filed on even date, and entitled "Consumable Materials Having Topographical Surface Patterns For Use In Extrusion-Based Digital Manufacturing Systems", which published as U.S. Provisional Patent Application Publication No. 2011/0076495, and which claims priority to U.S. Provisional Patent Application No. 61/247,078, filed on Sep. 30, 2009.

BACKGROUND

The present disclosure relates to direct digital manufacturing systems for building three-dimensional (3D) models. In particular, the present invention relates to extrusion head liquefiers for use in extrusion-based digital manufacturing systems.

An extrusion-based digital manufacturing system (e.g., fused deposition modeling systems developed by Stratasys, Inc., Eden Prairie, Minn.) is used to build a 3D model from a digital representation of the 3D model in a layer-by-layer manner by extruding a flowable consumable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D model resembling the digital representation.

Movement of the extrusion head with respect to the substrate is performed under computer control, in accordance with build data that represents the 3D model. The build data is obtained by initially slicing the digital representation of the 3D model into multiple horizontally sliced layers. Then, for each sliced layer, the host computer generates a build path for depositing roads of modeling material to form the 3D model.

In fabricating 3D models by depositing layers of a modeling material, supporting layers or structures are typically built underneath overhanging portions or in cavities of objects under construction, which are not supported by the modeling material itself. A support structure may be built utilizing the same deposition techniques by which the modeling material is deposited. The host computer generates additional geometry acting as a support structure for the overhanging or free-space segments of the 3D model being formed. Consumable support material is then deposited from a second nozzle pursuant to the generated geometry during the build process. The support material adheres to the modeling material during fabrication, and is removable from the completed 3D model when the build process is complete.

SUMMARY

An aspect of the present disclosure is directed to a ribbon liquefier for use in an extrusion-based digital manufacturing system having a drive mechanism and a heat transfer component. The ribbon liquefier includes an outer liquefier portion configured to receive thermal energy from the heat transfer component, and a channel at least partially defined by the outer liquefier portion. The channel has dimensions that are configured to receive a ribbon filament, wherein the ribbon liquefier is configured to melt the ribbon filament received in the channel to at least an extrudable state with the received thermal energy to provide a melt flow. Additionally, the dimensions of the channel are further configured to conform the melt flow from an axially-asymmetric flow to a substantially axially-symmetric flow in an extrusion tip connected to the ribbon liquefier.

Another aspect of the present disclosure is directed to a ribbon liquefier for use in an extrusion-based digital manufacturing system having a drive mechanism and a heat transfer component, where the ribbon liquefier includes an outer tube having an exterior surface and an interior surface, and where the exterior surface of the outer tube is configured to engage with the heat transfer component. The ribbon liquefier also includes a core portion disposed within the outer tube and having an exterior surface, and a shim component disposed between the outer tube and the core portion. The shim component has a gap that extends along a longitudinal length of the shim component, where the gap defines a channel between the interior surface of the outer tube and the exterior surface of the core portion. The channel has dimensions that are configured to receive a ribbon filament, where the exterior surface of the core portion is configured to provide backing support to the ribbon filament when the drive mechanism is engaged with the ribbon filament.

Another aspect of the present disclosure is directed to a method for building a three-dimensional model in an extrusion-based digital manufacturing system. The method includes driving a ribbon filament through a channel of a ribbon liquefier, where the ribbon liquefier further includes an outer liquefier portion that at least partially defines the channel. The method also includes melting the ribbon filament in the channel to at least an extrudable state to provide a melt flow, where the dimensions of the channel conform the melt flow to an axially-asymmetric flow, and extruding the melt flow from an extrusion tip of the ribbon liquefier, where the melt flow has a substantially axially-symmetric flow in the extrusion tip.

BRIEF DESCRIPTION OF THE DRAWINGS

FIG. 1 is a front view of an extrusion-based digital manufacturing system that includes ribbon liquefiers for melting received ribbon filaments of modeling and support materials.

FIG. 6 is a side view of the ribbon liquefier in use with a drive mechanism having a rotatable pulley for receiving, melting, and extruding a ribbon filament.

FIG. 7 is a side view of the ribbon liquefier in use with an alternative drive mechanism having a threaded rotatable shaft mechanism for receiving, melting, and extruding a ribbon filament.

DETAILED DESCRIPTION

Figure 2:
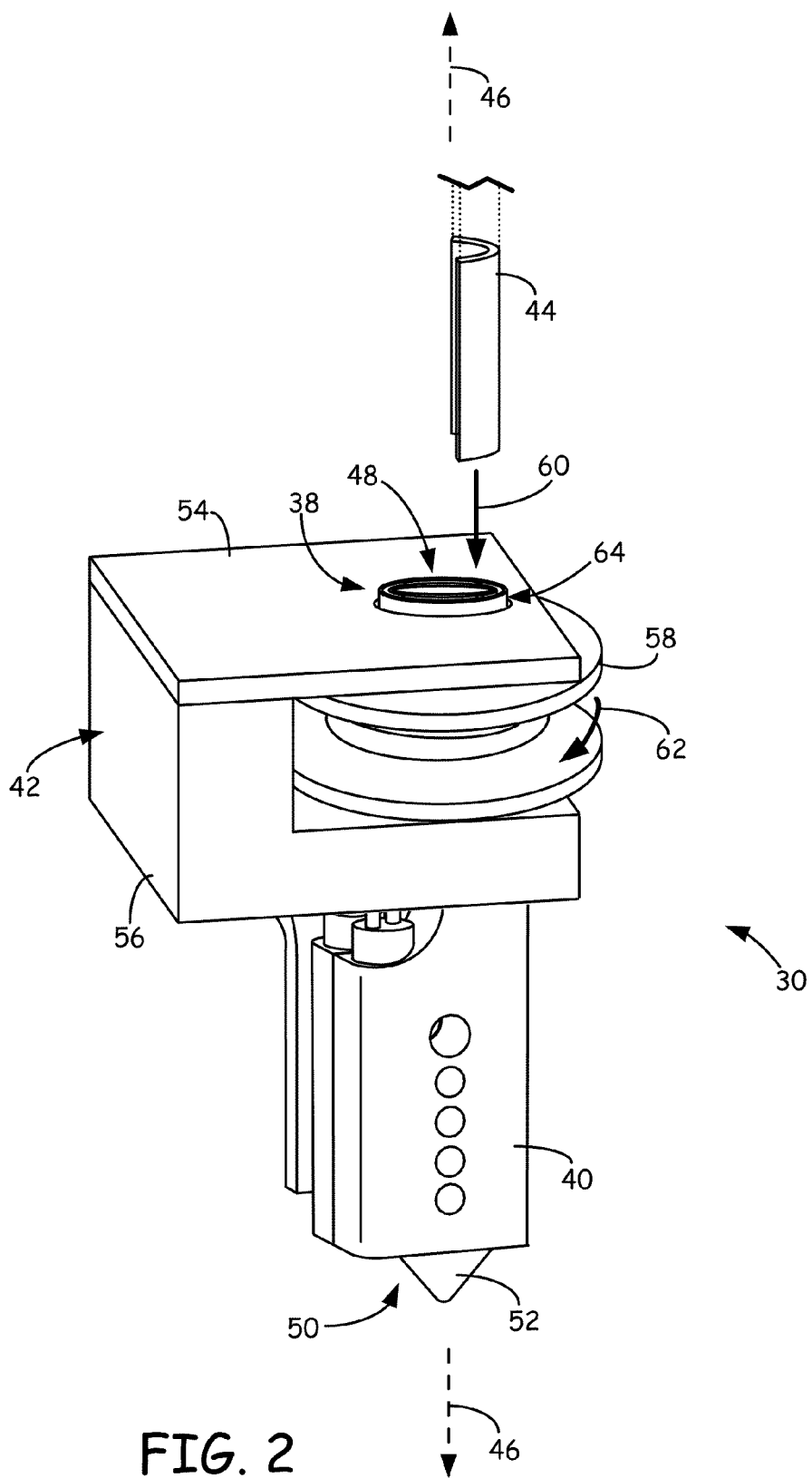
FIG. 2 is a top perspective view of a subassembly of the extrusion head, which includes a ribbon liquefier engaged with a drive mechanism and a thermal block.

The present disclosure is directed to a ribbon liquefier for use in extrusion-based digital manufacturing systems, where the ribbon liquefier is configured to receive ribbon filaments of modeling and/or support materials. As used herein, the term "ribbon filament" refers to a strand of a material having a non-cylindrical geometry, such as a rectangular and/or a film-like cross-section. This is in comparison to a "cylindrical filament", which has a cross-sectional profile that is circular. The use of the ribbon filament in combination with the ribbon liquefier allows the modeling and support materials to be melted and extruded with reduced response times. This is beneficial for improving depositional accuracies and reducing build times, thereby increasing process efficiencies for building 3D models and corresponding support structures with the ribbon liquefier.

FIG. 1 is a front view of system 10, which is an extrusion-based digital manufacturing system that includes build chamber 12, platen 14, gantry 16, extrusion head 18, and supply sources 20 and 22, where extrusion head 18 may include one or more ribbon liquefiers (not shown in FIG. 1) for melting successive portions of ribbon filaments (not shown in FIG. 1) during a build operation with system 10. Suitable extrusion-based digital manufacturing systems for system 10 include fused deposition modeling systems developed by Stratasys, Inc., Eden Prairie, Minn.

Build chamber 12 is an enclosed environment that contains platen 14, gantry 16, and extrusion head 18 for building a 3D model (referred to as 3D model 24) and a corresponding support structure (referred to as support structure 26). Platen 14 is a platform on which 3D model 24 and support structure 26 are built, and moves along a vertical z-axis based on signals provided from a computer-operated controller (referred to as controller 28). Gantry 16 is a guide rail system configured to move extrusion head 18 in a horizontal x-y plane within build chamber 12 based on signals provided from controller 28. The horizontal x-y plane is a plane defined by an x-axis and a y-axis (not shown in FIG. 1), where the x-axis, the y-axis, and the z-axis are orthogonal to each other. In an alternative embodiment, platen 14 may be configured to move in the horizontal x-y plane within build chamber 12, and extrusion head 18 may be configured to move along the z-axis. Other similar arrangements may also be used such that one or both of platen 14 and extrusion head 18 are moveable relative to each other.

Extrusion head 18 is supported by gantry 16 for building 3D model 24 and support structure 26 on platen 14 in a layer-by-layer manner, based on signals provided from controller 30. Extrusion head 18 includes subassemblies 30 and 32, each of which desirably includes a ribbon liquefier of the present disclosure. Accordingly, subassembly 30 is configured to receive and melt successive portions of a modeling material ribbon filament with a first ribbon liquefier (not shown in FIG. 1), and subassembly 32 is configured to receive and melt successive portions of a support material ribbon filament with a second ribbon liquefier (not shown in FIG. 1).

The modeling material ribbon filament may be provided to subassembly 30 from supply source 20 through pathway 34. Similarly, the support material ribbon filament may be provided to subassembly 32 from supply source 22 through pathway 36. System 10 may also include additional drive mechanisms (not shown) configured to assist in feeding the ribbon filaments from supply sources 20 and 22 to subassemblies 30 and 32. Supply sources 20 and 22 are sources (e.g., spooled containers) for the modeling and support ribbon filaments, and are desirably retained at a remote location from build chamber 12. Suitable assemblies for supply sources 20 and 22 are disclosed in Swanson et al., U.S. Pat. No. 6,923,634; Comb et al., U.S. Pat. No. 7,122,246; and Taatjes et al, U.S. Patent Application Publication Nos. 2010/0096489 and 2010/0096485.

During a build operation, gantry 16 moves extrusion head 18 around in the horizontal x-y plane within build chamber 12, and the ribbon filaments are fed to subassemblies 30 and 32. Subassembly 30 thermally melts the successive portions of the received modeling material ribbon filament, thereby allowing the molten material to be extruded to build 3D model 24. Similarly, subassembly 32 thermally melts the successive portions of the support material ribbon filament, thereby allowing the molten material to be extruded to build support structure 26. The upstream, unmelted portions of the ribbon filaments may each function as a piston with a viscosity-pump action to extrude the molten material out of the respective subassemblies 30 and 32.

The extruded modeling and support materials are then deposited onto platen 14 to build 3D model 24 and support structure 26 using a layer-based additive technique. Support structure 26 is desirably deposited to provide vertical support along the z-axis for overhanging regions of the layers of 3D model 24. This allows 3D model 24 to be built with a variety of geometries. After the build operation is complete, the resulting 3D model 24/support structure 26 may be removed from build chamber 12, and support structure 26 may be removed from 3D model 24.

FIG. 2 is a top perspective view of subassembly 30 of extrusion head 18, where the following discussion of subassembly 30 is equally applicable to subassembly 32 (shown in FIG. 1). As shown in FIG. 2, subassembly 30 includes ribbon liquefier 38, thermal block 40, and drive mechanism 42, where drive mechanism 42 feeds successive portions of ribbon filament 44 through ribbon liquefier 38. In the shown embodiment, ribbon liquefier 38 includes a series of annular tubes extending between top end 48 and bottom end 50. Top end 48 and bottom end 50 are opposing ends of ribbon liquefier 38 along longitudinal axis 46, where top end 48 is configured to receive ribbon filament 44 in a flexed state. When subassembly 30 is mounted in system 10 (shown in FIG. 1) longitudinal axis 46 corresponds to the vertical z-axis. As shown in FIG. 2, the annular tubes of ribbon liquefier 38 extend through drive mechanism 42 and thermal block 40 along longitudinal axis 46.

Ribbon liquefier 38 also includes extrusion tip 52, which is a small-diameter tip that is located at a bottom end 50 and is configured to extrude the molten material of ribbon filament 44 with a desired road width. In one embodiment, extrusion tip 52 is removably securable to one or more of the annular tubes at bottom end 50, thereby allowing multiple extrusion tips 52 to be interchangeably used. Examples of suitable inner tip diameters for extrusion tip 52 range from about 125 micrometers (about 0.005 inches) to about 510 micrometers (about 0.020 inches).

Thermal block 40 is a heat transfer component that extends around at least a portion of ribbon liquefier 38 and is configured to conduct heat to ribbon liquefier 38 and the received ribbon filament 44. Examples of suitable heat transfer components for thermal block 40 include those disclosed in Swanson et al., U.S. Pat. No. 6,004,124; Comb, U.S. Pat. No. 6,547,995; LaBossiere et al., U.S. Publication No. 2007/0228590; and Batchelder et al., U.S. Patent Application Publication No. 2009/0273122. In alternative embodiments, thermal block 40 may be replaced with a variety of different heat transfer components that generate thermal gradients along longitudinal axis 46

Drive mechanism 42 includes support plate 54, base block 56, and pulley 58, where pulley 58 is rotatably secured between support plate 54 and base block 56. Support plate 54 and base block 56 are support components of drive mechanism 42, and one or both of support plate 54 and base block 56 may be secured to extrusion head 18 (shown in FIG. 1). Pulley 58 is a rotatable component that drives successive portions of ribbon filament 44 through ribbon liquefier 38 with the use of an internally-threaded surface (not shown in FIG. 2). Examples of suitable filament drive mechanisms for drive mechanism 42 include those disclosed in Batchelder et al., U.S. Patent Application Publication Nos. 2009/0274540 and 2009/02731221.

During a build operation in system 10 (shown in FIG. 1), ribbon filament 44 is desirably flexed to a flexed state for alignment with ribbon liquefier 38. The flexed ribbon filament 44 may then be loaded into ribbon liquefier 38 at top end 48 (represented by arrow 60) to engage with the internally-threaded surface of pulley 58. Pulley 58 is then rotated (represented by arrow 62) based on signals provided from controller 28 (shown in FIG. 1). The rotation of pulley 58 correspondingly rotates the internally-threaded surface of pulley 58, which drives successive portions of ribbon filament 44 through ribbon liquefier 38.

As ribbon filament 44 passes through ribbon liquefier 38, the thermal gradient generated by thermal block 40 melts the material of ribbon filament 44 within ribbon liquefier 38 to at least an extrudable state. The upstream, unmelted portion of ribbon filament 44 being driven by drive mechanism 42 functions as a piston with a viscosity pump acting on the molten material between the unmelted portion the walls of ribbon liquefier 38, thereby extruding the molten material out of extrusion tip 52. The extruded material may then be deposited as roads to form 3D model 24 in a layer-by-layer manner.

As further shown in FIG. 2, top end 48 of ribbon liquefier 38 is located at an upstream position along longitudinal axis 46 relative to drive mechanism 42. As such, ribbon filament 44 may enter ribbon liquefier 38 at an inlet region (referred to as inlet region 64) prior to engaging with drive mechanism 42, and may be continuously supported by ribbon liquefier 38 during and after the engagement with drive mechanism 42. This reduces the risk of interrupting a build operation with extrusion head 18, and may allow higher driving forces to be attained because ribbon filament 44 is supported from buckling.

The cross-sectional profiles of ribbon liquefier 38 and ribbon filament 44 allow ribbon filament 44 to be melted and extruded from extrusion head 18 with reduced response times compared to cylindrical filaments and liquefiers. As discussed in U.S. Provisional Patent Application No. 61/247,067; and U.S. Patent Application No. 2011/0076496, it is believed that the cross-sectional profiles of ribbon liquefier 38 and ribbon filament 44 effectively remove the core that is associated with a cylindrical filament having a circular cross-section. This allows ribbon filament 44 to be melted and extruded from extrusion head 18 with reduced response times, which can correspondingly increase process efficiencies in system 10 for building 3D model 24 and/or support structure 26.

For example, reduced response times may increase the accuracy of start and stop locations for deposited roads of modeling and support materials. During a build operation to form a layer of a 3D model (e.g., 3D model 24), an extrusion head (e.g., extrusion head 18) is moved in a horizontal x-y plane and deposits a molten modeling material. After a given deposition pattern is completed, the extrusion head stops depositing the modeling material. This is accomplished by stopping the filament from being fed into the liquefier of the extrusion head, thereby halting the viscosity-pump action of the filament.

However, the response time between when the extrusion head stops feeding the filament to the liquefier and when the modeling material actually stops extruding from the extrusion head is not instantaneous. Instead, there is a delay that is based on factors such as the thermal properties of the liquefier, the composition of the filament, and, as discussed below, the cross-sectional profile of the filament and liquefier channel. Similarly, there is also a response time delay associated with the transition from a zero-flow state to a steady-state flow. Liquefiers and filaments that require large response times increase these delays, thereby potentially decreasing depositional accuracies. Reducing the response times, however, can improve the aesthetic and structural qualities of the resulting 3D model, particularly when building 3D models containing fine features.

For example, a reduced response time for system 10 can gate the acceleration of gantry 16 at suitable locations near the deposition start and stop points. This can increase the ability to hide the seams of each layer, which can increase part quality. Additionally, the response time determines how far gantry 16 can deviate from a constant tangential velocity as gantry 16 travels around a corner in the x-y plane. As a result, a reduced response time allows extrusion head 18 to achieve greater cornering accelerations and decelerations. This can reduce the production times required to build 3D models and support structures, much in the same manner as the cornering capabilities of a race car are important for reducing an overall race time.

Figure 3:
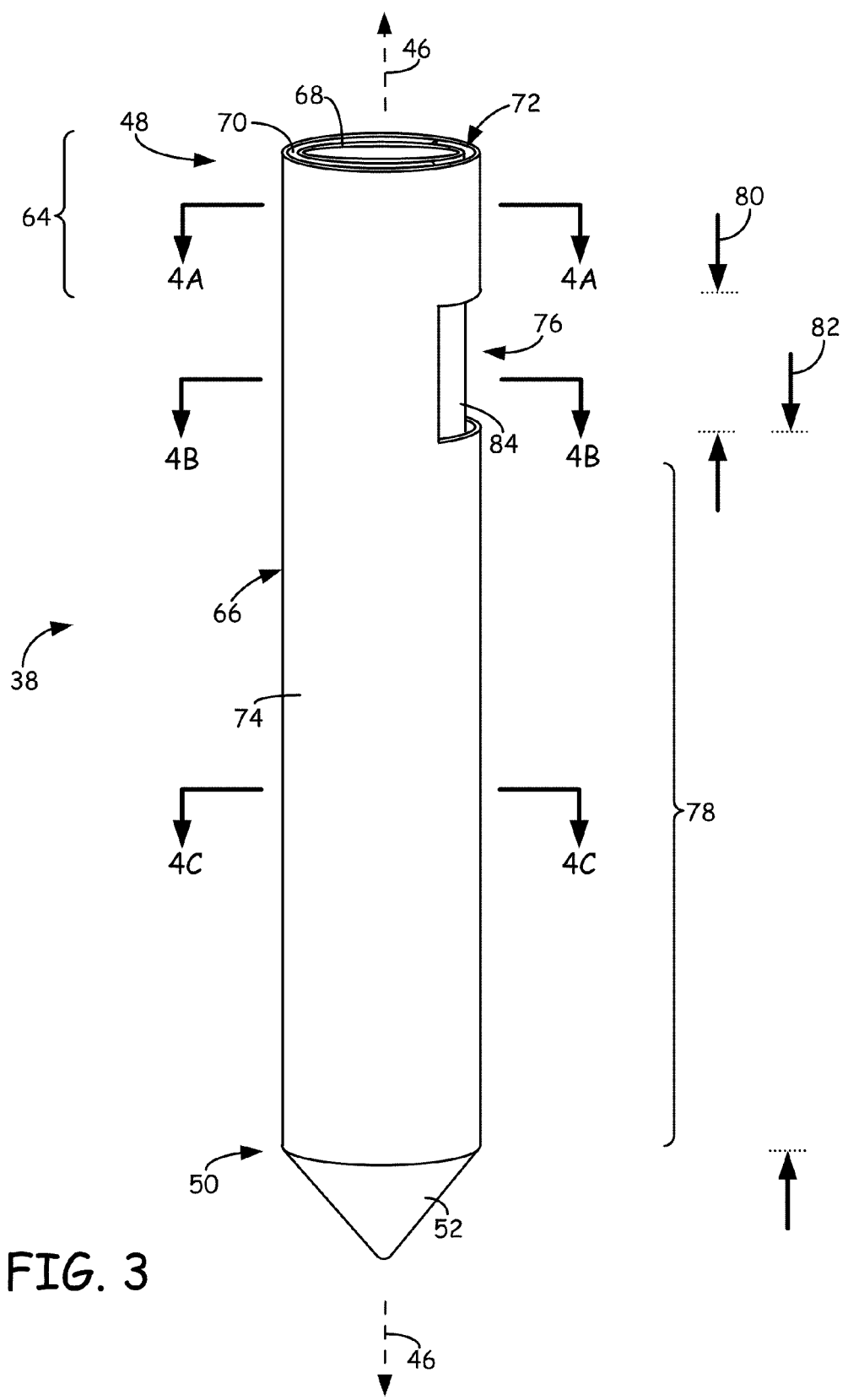
FIG. 3 is a perspective view of the ribbon liquefier, which includes a ported outer tube.

FIG. 3 is an expanded perspective view of ribbon liquefier 38, which includes outer tube 66, core tube 68, and shim component 70. As shown, shim component 70 is disposed circumferentially between outer tube 66 and core tube 68, such that outer tube 66, core tube 68, and shim component 70 define channel 72 extending along longitudinal axis 46 between top end 48 and bottom end 50. As discussed below, channel 72 is the portion of ribbon liquefier 38 that receives ribbon filament 44 (shown in FIG. 2).

Outer tube 66, core tube 68, and shim component 70 may each be fabricated from a variety of materials, which are desirably capable of withstanding the thermal energy from thermal block 40 and any elevated temperature of build chamber 12 (shown in FIG. 1). Suitable materials for fabricating each of outer tube 66, core tube 68, and shim component 70 include thermally-conductive, metallic materials, such as stainless steel.

Outer tube 66 is an outer liquefier portion of ribbon liquefier 38 that includes exterior surface 74, which extends along longitudinal axis 46 between top end 48 and bottom end 50. In the shown embodiment, outer tube 66 has a cylindrical cross-section. In alternative embodiments, outer tube 66 may be replaced with tubes having different cross-sectional geometries. Accordingly, as used herein, the term "tube" includes a variety of hollow geometries, such as cylindrical geometries, elliptical geometries, polygonal geometries (e.g., rectangular and square geometries), axially-tapered geometries, and the like. Exterior surface 74 is the portion of outer tube 66 that contacts thermal block 40 for generating a thermal gradient along ribbon liquefier 38. The thermal gradient creates a temperature profile in ribbon filament 44 along longitudinal axis 46, which melts successive portions of ribbon filament 44 as ribbon filament 44 is driven through ribbon liquefier 38.

As further shown in FIG. 3, outer tube 66 also includes port 76 and heated length 78. Port 76 is a lateral opening through outer tube 66 between inlet region 64 and heated length 78. As discussed below, port 76 allows pulley 58 (shown in FIG. 2) to engage with ribbon filament 44 after ribbon filament 44 is loaded into channel 72. This allows the internally-threaded surface of pulley 58 to drive ribbon filament 44 toward heated length 78.

The dimensions of port 76 may vary depending on the dimensions of ribbon filament 44 and on the drive mechanism used (e.g., drive mechanism 42). For example, the length of port 76 along longitudinal axis 46 (referred to as port length 80) may vary depending on the dimensions of the internally-threaded surface of pulley 58. Examples of suitable lengths for port length 80 range from about 1.25 millimeters (about 0.05 inches) to about 25.0 millimeters (about 1.0 inch), with particularly suitable lengths 64 ranging from about 5.1 millimeters (about 0.2 inches) to about 12.7 millimeters (about 0.5 inches).

Heated length 78 is a region along outer tube 66 in which the thermal gradient generated by thermal block 40 (shown in FIG. 2) exists for melting ribbon filament 44. Heated length 78 desirably extends along the longitudinal length of outer tube 66 below port 76, thereby preventing ribbon filament 44 from melting while engaged with pulley 58. Accordingly, heated length 78 desirably extends along the longitudinal length of outer tube 66 between port 76 and bottom end 50/extrusion tip 52. In one embodiment, extrusion head 18 (shown in FIG. 1) may also include an airflow manifold (not shown) configured to direct cooling air toward top end 48 and/or port 76 to further reduce the risk of the thermal gradient affecting ribbon filament 44 at port 76.

Suitable dimensions for heated length 78 to exist, between port 76 and bottom end 50 (referred to as length 82), may vary depending on the heat transfer properties of thermal block 40, the thickness and material of outer tube 66, and the thickness, material, and drive rate of ribbon filament 44. Examples of suitable lengths for length 82 range from about 13 millimeters (about 0.5 inch) to about 130 millimeters (about 5.0 inches), with particularly suitable lengths 88 ranging from about 25 millimeters (about 1.0 inch) to about 51 millimeters (about 2.0 inches).

Core tube 68 is a core portion of ribbon liquefier 38 and is disposed within outer tube 66 between top end 48 and bottom end 50. As shown, core tube 68 includes exterior surface 84, which is exposed at port 76. While shown as a hollow tube, a variety of alternative core portions may be used in lieu of core tube 68, such as non-hollow, filled core portions. These embodiments may be beneficial to strengthen the lateral support for ribbon filament 44 when engaged with drive mechanism 40. Nonetheless, the use of a hollow tube (e.g., core tube 68) for the core portion is beneficial for reducing the weight of ribbon liquefier 38, and may allow electrical and/or thermal components to be retained therein. For example, one or more additional heat transfer components (not shown) may be secured within core tube 68 to assist thermal block 40 in generating a thermal gradient along longitudinal axis 46. In these embodiments, core tube 68 desirably has a wall thickness that is sufficient to support ribbon filament 44 when engaged with drive mechanism 42 (e.g., at least about 0.25 millimeters (about 0.01 inches)). Furthermore, as discussed above for outer tube 66, core tube 68 may also be replaced with tubes having different cross-sectional geometries.

Shim component 70 is a C-shaped component secured between outer tube 66 and core tube 68, and also extends between top end 48 and bottom end 50. As discussed below, shim component 70 includes a gap extending between top end 48 and bottom end 50, and is substantially aligned with port 76. The gap of shim component 70 between outer tube 66 and core tube 68 defines channel 72, which has an arcuate cross-section and is substantially aligned with port 76. This arrangement allows drive mechanism 42 to engage ribbon filament 44 while ribbon filament 44 extends through channel 72, where the portion of exterior surface 84 at port 76 may function as a lateral backing support for ribbon filament 44 when engaged with drive mechanism 42.

During the manufacture of subassembly 30 (shown in FIGS. 1 and 2), ribbon liquefier 38 may be secured within thermal block 40 such that port 76 extends above thermal block 40. As discussed above, this desirably restricts heated length 78 to a location below port 76. Ribbon liquefier 38 may be secured within thermal block 40 in a variety of manners. In one embodiment, thermal block 40 may be separated (or otherwise opened) to allow direct access within thermal block 40. Ribbon liquefier 38 may then be inserted within thermal block 40, and thermal block 40 may be reassembled (or otherwise closed) to provide good thermally-conductive contact between outer tube 66 of ribbon liquefier 38 and thermal block 40. Extrusion tip 52 may also be secured to outer tube 66 at bottom end 50. Ribbon liquefier 38 may also be secured to drive mechanism 42 in a manner that allows the internally-threaded surface of pulley 58 to engage with ribbon liquefier 38 at port 76.

During operation, the dimensions of channel 72 are configured to conform the melt flow of the molten material of ribbon filament 44 to an axially-asymmetric flow, which in this example, is an arcuate-patterned flow. Upon reaching extrusion tip 52, however, this melt flow changes to a substantially axially-symmetric flow for extrusion. This is in contrast to a cylindrical liquefier, in which a melt flow remains as an axially-symmetric flow in the cylindrical liquefier and in the extrusion tip.

Figure 4A:
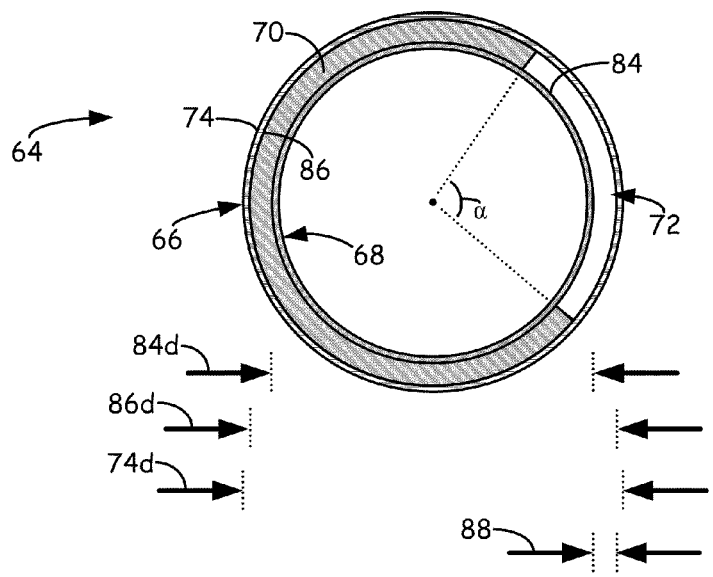
FIG. 4A is a sectional view of section 4A-4A taken in FIG. 3.
Figure 4B:
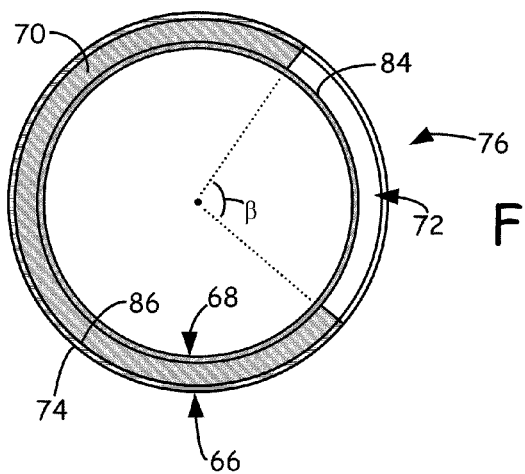
FIG. 4B is a sectional view of section 4B-4B taken in FIG. 3.
Figure 4C:
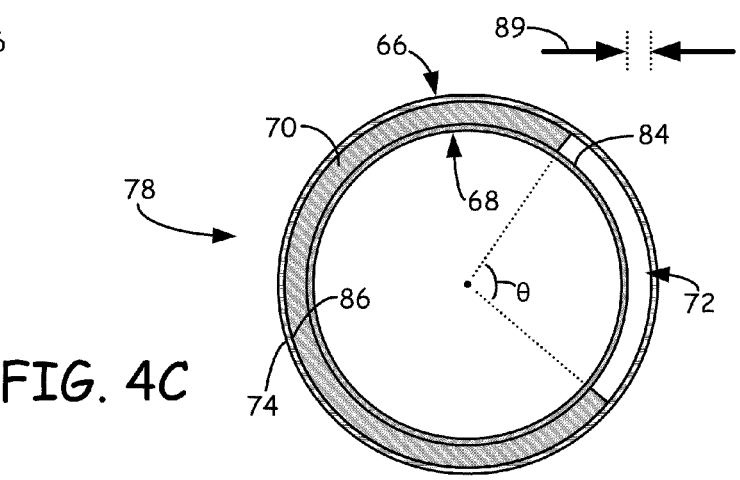
FIG. 4C is a sectional view of section 4C-4C taken in FIG. 3.

FIGS. 4A-4C are sectional views of sections 4A-4A, 4B-4B, and 4C-4C respectively taken in FIG. 3. The section shown in FIG. 4A illustrates inlet region 64. As shown, outer tube 66 further includes interior surface 86, where interior surface 86 defines an inner diameter of outer tube 66 (referred to as inner diameter 86*d*). Examples of suitable average diameters for inner diameter 86*d* range from about 3.8 millimeters (about 0.15 inches) to about 10.2 millimeters (about 0.40 inches), with particularly suitable diameters ranging from about 5.1 millimeters (about 0.20 inches) to about 7.6 millimeters (about 0.30 inches).

Correspondingly, exterior surface 74 defines an outer diameter of outer tube 66 (referred to as outer diameter 74d). Outer diameter 74d may vary depending on the wall thickness of outer tube 66 and inner diameter 86d, and desirably allows outer tube 66 to be inserted through support plate 54, pulley 58, and base block 56 of drive mechanism 42 (shown in FIG. 2), and to be retained by one or both of support plate 54 and base block 56. Accordingly, examples of suitable average wall thicknesses for liquefier tube 66 (i.e., the difference between outer diameter 74d and inner diameter 86d) range from about 1.3 millimeters (about 0.05 inches) to about 7.6 millimeters (about 0.30 inches), with particularly suitable thicknesses ranging from about 2.5 millimeters (about 0.10 inches) to about 5.1 millimeters (about 0.20 inches).

As further shown in FIG. 4A, exterior surface 84 of core tube 68 defines an outer diameter of core tube 68 (referred to as outer diameter 84d). The difference between inner diameter 86d of outer tube 66 and outer diameter 84d of core tube 68 accordingly defines the thickness of channel 72 (referred to as channel thickness 88). Examples of suitable dimensions for channel thickness 88 range from about 0.25 millimeters (about 0.01 inches) to about 2.5 millimeters (about 0.10 inches), with particularly suitable thicknesses ranging from about 0.51 millimeters (about 0.02 inches) to about 2.0 millimeters (about 0.08 inches), and with even more particularly suitable thicknesses ranging from about 0.76 millimeters (about 0.03 inches) to about 1.8 millimeters (about 0.07 inches). Because channel 72 is defined in part by the gap in shim component 70, shim component 70 also has a thickness corresponding to channel thickness 88.

In the shown embodiment, channel 72 also has an arcuate width extending across the gap in shim component 70, which desirably corresponds to the dimensions of ribbon filament 44 in a flexed state. The arcuate width may be measured by an angle (referred to as angle α) from a radially-concentric point of channel 72, such as shown in FIG. 4A. Examples of suitable angles for angle α range from about 30 degrees to about 180 degrees, with particularly suitable angles ranging from about 45 degrees to about 130 degrees, and with even more particularly suitable angles ranging from about 60 degrees to about 90 degrees.

Alternatively, the width of channel 72 may be measured based on a rectangular geometry rather than its arcuate geometry. Examples of suitable dimensions for the width of channel 72 range from about 1.0 millimeter (about 0.04 inches) to about 12.7 millimeters (about 0.50 inches), with particularly suitable widths ranging from about 3.0 millimeters (about 0.12 inches) to about 10.1 millimeters (about 0.40 inches), and with even more particularly suitable widths ranging from about 3.8 millimeters (about 0.15 inches) to about 6.4 millimeters (about 0.25 inches).

As discussed above, the aspect ratios of ribbon liquefier 38 and ribbon filament 44 may be selected to effectively removing a core that is associated with a filament feedstock having a circular cross-section. This allows the ribbon liquefier 38 to attain reduced response times compared to cylindrical liquefiers having the same volumetric flow rates. In particular, as disclosed in U.S. Provisional Patent Application No. 61/247,067; and U.S. Patent Application Publication No. 2011/0076496, high aspect ratios are particularly suitable for reducing response rates. Accordingly, examples of suitable aspect ratios of the width of channel 72 to channel thickness 88 include aspect ratios of about 2:1 or greater.

In some situations, aspect ratios that are too large may place undesirably high loads on outer surface 84 and ribbon filament 44, and may also increase the frictional drag between ribbon filament 44 and channel 72. Accordingly, examples of particularly suitable aspect ratios of the width of channel 72 to channel thickness 88 range from about 2.5:1 to about 20:1, with more particularly suitable aspect ratios ranging from about 3:1 to about 10:1, and with even more particularly suitable aspect ratios ranging from about 3:1 to about 8:1.

An additional distinction from cylindrical liquefiers can be made by comparing the dimensions in which thermal energy diffuses within the given liquefier. Thermal energy is diffused to cylindrical filaments received within cylindrical liquefiers in two dimensions, where about 50% of the thermal energy is diffused along a first dimension (e.g., along the x-axis) and about 50% of the thermal energy diffused along a second dimension (e.g., along the y-axis). In comparison, however, the majority of the thermal energy is diffused to ribbon filament 44 in liquefier 38 along only one dimension. In fact, this single dimension diffusion increases with the aspect ratio of ribbon filament 44 and liquefier 38. Accordingly, for the above-discussed suitable aspect ratios, at least about 60% of the thermal energy is diffused only in one dimension, more desirably at least about 65% of the thermal energy is diffused only in one dimension, and even more desirably at least about 70% of the thermal energy is diffused only in one dimension.

In one embodiment, exterior surface 84 of core tube 68 and/or interior surface 86 of outer tube 66 may be smoothed and/or polished to reduce sliding friction of ribbon filament 44. In an additional embodiment, one or more portions of exterior surface 84 and interior surface 86 at inlet region 64 may include a low-surface energy coating to further reduce friction with ribbon filament 44. Suitable coating materials include fluorinated polymers (e.g., polytetrafluoroethenes, fluorinated ethylene propylenes, and perfluoroalkoxy polymers), diamond-like carbon materials, and combinations thereof.

The section shown in FIG. 4B illustrates port 76, which, in the shown embodiment has an arcuate width that is substantially aligned with channel 72. In alternative embodiments, the arcuate width of channel 72 may be greater than that of port 76. The angle of the arcuate width of port 76 (referred to as angle β) may vary depending on the engagement between the internally-threaded surface of the pulley 58 and on the arcuate width of channel 72. Accordingly, examples of suitable angles for angle β range from about 30 degrees to about 180 degrees, with particularly suitable angles ranging from about 45 degrees to about 130 degrees, and with even more particularly suitable angles ranging from about 60 degrees to about 90 degrees.

The section shown in FIG. 4C illustrates heated length 78, where, in the shown embodiment, channel 72 at heated length 78 has the same dimensions as at inlet region 64 (shown in FIG. 4A) and at port 76 (shone in FIG. 4B). Thus, in this embodiment, channel 72 has the substantially same dimensions along longitudinal axis 46 between top end 48 and bottom end 50. In alternative embodiments, the thickness (referred to as channel thickness 89) and/or the arcuate width of channel 72 may vary along longitudinal axis 46. For example, one or both of channel thickness 89 and the width of channel 72 may gradually decrease when traveling downward along heated length 78 toward bottom end 50.

Examples of suitable average thicknesses for channel thickness 89 include those discussed above for channel thickness 88 (shown in FIG. 4A), where channel thickness 89 may be the same as channel thickness 88 or may gradually decrease along longitudinal length 46 toward bottom end 50. Similarly, examples of suitable angles for the arcuate width (referred to as angle θ) include those discussed above for angle α (shown in FIG. 4A), where angle θ may be the same as angle α or may gradually decrease along longitudinal length 46 toward bottom end 50.

Figure 5:
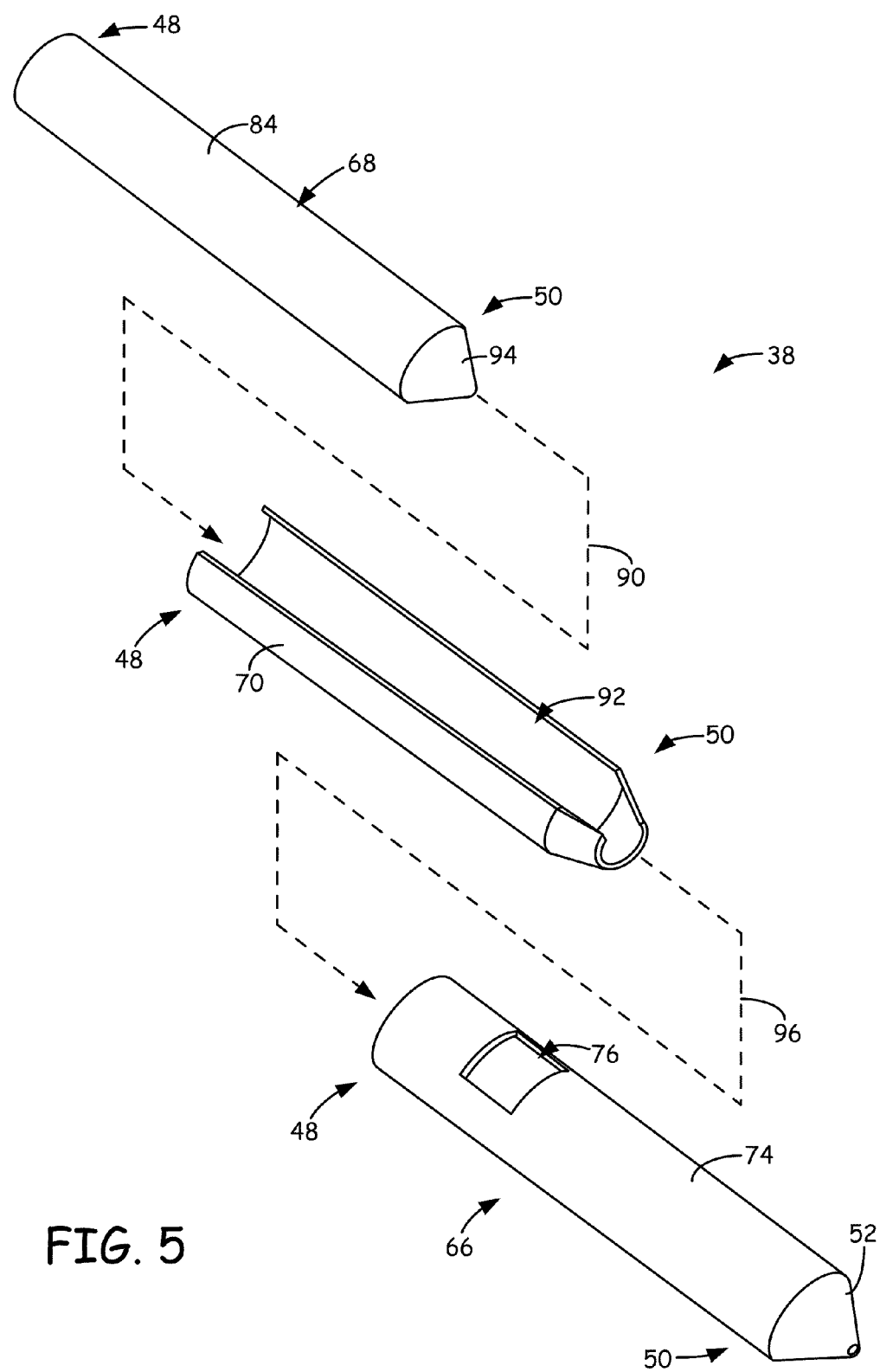
FIG. 5 is an exploded perspective view of the ribbon liquefier.

FIG. 5 is an exploded perspective view of ribbon liquefier 38, illustrating a technique for manufacturing ribbon liquefier 38. Ribbon liquefier 38 may be manufactured by initially inserting shim component 70 around exterior surface 84 of core tube 68 (e.g., sliding core tube 68 into shim component 70, as shown by arrow 90). Shim component 70 may be secured around exterior surface 84 in a variety of manners, such as with a friction fitting, adhesive compounds, and/or welding operations.

Shim component 70 includes a gap (referred to as gap 92) that partially defines channel 72, as discussed above. Additionally, the portion of shim component 70 at bottom end 50 of ribbon liquefier 38 is tapered to fit within extrusion tip 52, where gap 92 may also correspondingly decrease in arcuate width. Core tube 68 also includes conical tip 94 at bottom end 50 of ribbon liquefier 38, which is also tapered to fit within shim component 70 and extrusion tip 52. Conical tip 94 is also desirably a sealed tip to prevent the molten material from back flowing into the hollow bore region of core tube 68.

The assembled core tube 68/shim component 70 may then be inserted into outer tube 66 (shown by arrow 96), and gap 92 is desirably aligned with port 76. Outer tube 66 may be secured around core tube 68/shim component 70 in a variety of manners, such as with a friction fitting, adhesive compounds, and/or welding operations. This provides channel 72, which is defined by exterior surface 84 of core tube 68, interior surface 86 of outer tube 66, and shim component 70 at gap 92, and extends from top end 48 to extrusion tip 52 at bottom end 50.

Outer tube 66, core tube 68, shim component 70 may alternatively be assembled in a variety of manners. For example, shim component 70 may inserted within outer tube 66 prior to the insertion of core tube 68 within outer tube 66. Furthermore, core tube 68 may initially be inserted within outer tube 66, and shim component 70 may then be inserted between outer tube 66 and core tube 68. Additionally, extrusion tip 52 may be removably secured to outer tube 66 at bottom end 50 (e.g., screwed onto outer tube 66). In an additional alternative embodiment, one or more of outer tube 66, core tube 68, shim component 70 may be integrally formed (e.g., extruded or cast) together rather than as separate components that are subsequently assembled. The resulting ribbon liquefier 38 may then be installed in subassembly 30 of extrusion head 18, as discussed above.

As discussed above, the dimensions of channel 72 are configured to conform the melt flow of the molten material of ribbon filament 44 to an arcuate-patterned flow, which is a type of axially-asymmetric flow. However, as shown in FIG. 5, the dimensions of extrusion tip 52 and conical tip 94 provide dimensions that change the melt flow from the arcuate-patterned flow to an axially-symmetric flow for extrusion from extrusion tip 52. This is in contrast to a cylindrical liquefier, in which a melt flow remains as an axially-symmetric flow in the cylindrical liquefier and in the extrusion tip.

FIG. 6 is a side view of ribbon liquefier 38 in use with pulley 58 of drive mechanism 42 (shown in FIG. 2) for melting and extruding material of ribbon filament 44 to build 3D model 24 (or alternatively support structure 26, shown in FIG. 1). Thermal block 40, and support plate 54 and base block 56 of drive mechanism 42 are omitted in FIG. 6 for ease of discussion. As shown, pulley 58 includes inner surface 98, which is the internally-threaded surface of pulley 58 and is engaged with ribbon filament 44 at port 76. Examples of suitable internally-threaded surfaces for inner surface 98 are disclosed in Batchelder et al., U.S. Patent Application Publication Nos. 2009/0274540 and 2009/0273122.

During the build operation to form 3D model 24, ribbon filament 44 is loaded into channel 72 of liquefier 38 at top end 48. As discussed above, ribbon filament is desirably flexed to have a bowed cross-section that substantially aligns with the arcuate cross-section of channel 72. In one embodiment, ribbon filament 44 may be in a relaxed, non-flexed state while in supply source 20 (shown in FIG. 1) and while being fed through pathway 34 (shown in FIG. 1). Upon reaching top end 48 of ribbon liquefier 38, ribbon filament 42 may be flexed (e.g., manually flexed) to the desired bowed cross-section and fed into channel 72. As successive portions of ribbon filament 44 are pulled into channel 72, the arcuate cross-section of channel 72 may cause successive portions of ribbon filament 44 to automatically flex and conform the dimensions of channel 72.

The rotation of pulley 58 allows inner surface 98 to drive successive portions of ribbon filament 44 downward along longitudinal axis 46 through channel 72 toward heated length 78. While passing through channel 72 at heated length 78, the thermal gradient generated by thermal block 40 (shown in FIG. 2) melts the material of ribbon filament 44 to an extrudable state. The unmelted, successive portion of ribbon filament 44, located upstream from heated length 78, is driven by pulley 58 and inner surface 98, and functions as a piston with a viscosity pump acting on the molten material between the unmelted portion and channel 72, thereby extruding the molten material of ribbon filament 44 through extrusion tip 52. As discussed above, the cross-sectional dimensions of channel 72, particularly those in the above-discussed suitable aspect ratio ranges, allow the material of ribbon filament 44 to be extruded with reduced response times. The extruded material is then deposited as roads to build 3D model 24 in a layer-by-layer manner.

As also discussed above, inlet region 64 is located at an upstream position along longitudinal axis 46 relative to pulley 58. As such, ribbon filament 44 enters channel 72 prior to engaging with inner surface 98, and is continuously supported by exterior surface 84 of core tube 68 (shown in FIGS. 3-5) during and after the engagement with inner surface 98. This effectively eliminates the potential issues that may occur with extrusion heads having separate drive mechanisms and liquefiers (e.g., alignment and buckling), thereby reducing the risk of interrupting a build operation with extrusion head 18 (shown in FIG. 1).

FIG. 7 is a side view of liquefier tube 32 in use with rotatable shaft 100 of an alternative filament drive mechanism for melting and extruding material of ribbon filament 44 to build 3D model 24. Thermal block 40 (shown in FIG. 2) is omitted in FIG. 7 for ease of discussion. In this embodiment, rotatable shaft 100 includes threaded surface 102, which is an externally-threaded surface engaged with ribbon filament 44 at port 76. The rotation of rotatable shaft 100 allows threaded surface 102 to drive successive portions of ribbon filament 44 downward along longitudinal axis 46 through channel 72 toward heated length 78. The material of ribbon filament 44 is then melted in channel 72 at heated length 78, thereby allowing the molten material to be extruded from extrusion tip 52 to build 3D model 24 in a layer-by-layer manner.

In this embodiment, inlet region 64 is also located at an upstream position along longitudinal axis 46 relative to threaded surface 102. As such, ribbon filament 44 enters channel 72 prior to engaging with threaded surface 102, and is continuously supported exterior surface 84 of core tube 68 (shown in FIGS. 3-5) during and after the engagement with threaded surface 102. This effectively eliminates the potential issues that may occur with extrusion heads having separate drive mechanisms and liquefiers (e.g., alignment and buckling). Accordingly, ribbon liquefier 38 is suitable for use with a variety of different drive mechanisms, where the drive mechanisms may engage ribbon filament 44 after ribbon filament 44 is supported by core tube 68 (e.g., at port 76).

Figure 8A:
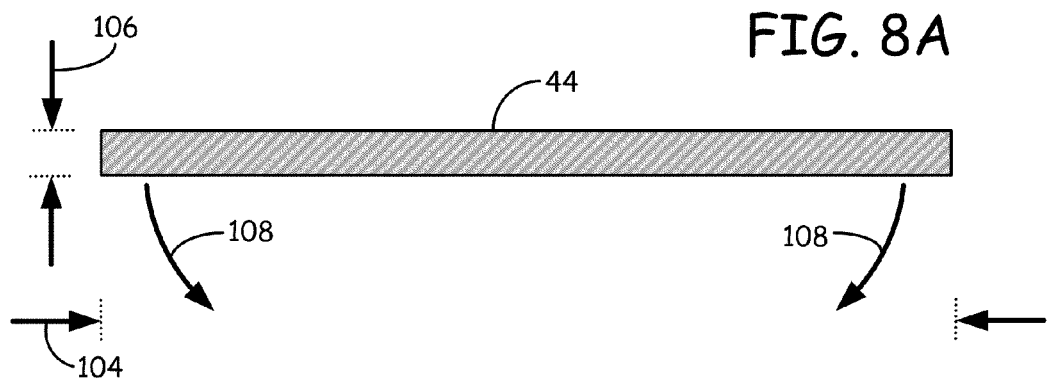
FIG. 8A is a sectional view of a ribbon filament in a relaxed, non-flexed state.
Figure 8B:
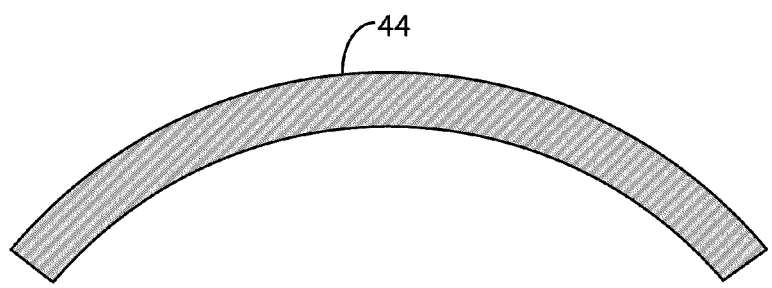
FIG. 8B is a sectional view of the ribbon filament in a flexed state.

FIGS. 8A and 8B are sectional views of ribbon filament 44 taken in a plane that is perpendicular to longitudinal axis 46 (shown in FIG. 2), where FIG. 8A depicts ribbon filament 44 in a relaxed, non-flexed state and FIG. 8B depicts ribbon filament 44 in a flexed state. As shown in FIG. 8A, ribbon filament 44 has width 104 and thickness 106, which generally correspond to channel thickness 88 and the arcuate width of channel 72 (shown in FIG. 4A). Ribbon filament 44 also has a continuous length that may vary depending on the amount of ribbon filament 44 remaining in supply source 20 (shown in FIG. 1).

Width 104 may vary depending on the dimensions of channel 72 and on how far ribbon filament 44 is flexed. Examples of suitable dimensions for width 104 range from about 1.0 millimeter (about 0.04 inches) to about 10.2 millimeters (about 0.40 inches), with particularly suitable widths ranging from about 2.5 millimeters (about 0.10 inches) to about 7.6 millimeters (about 0.30 inches), and with even more particularly suitable widths ranging from about 3.0 millimeters (about 0.12 inches) to about 5.1 millimeters (about 0.20 inches).

Suitable dimensions for thickness 106 desirably allow ribbon filament 44 to be inserted into channel 72 while in a flexed state. For example, thickness 106 is desirably low enough to allow ribbon filament 44 to axially flex to the flexed state (as represented by arrows 108) and to bend along its length to wind ribbon filament 44 in supply source 20 and to feed ribbon filament 44 through pathway 34 (shown in FIG. 1). For example, in one embodiment, ribbon filament 44 is desirably capable of withstanding elastic strains greater than t/r, where "t" is a cross-sectional thickness of ribbon filament 44 in the plane of curvature (e.g., thickness 106), and "r" is a bend radius (e.g., a bend radius in supply source 20 or 22 and/or a bend radius through pathway 34 or 36).

Thickness 106 is desirably thick enough to provide a suitable structural integrity for ribbon filament 44, thereby reducing the risk of fractures or breaks while ribbon filament 44 is retained in supply source 20 or 22 and while being fed through system 10 (e.g., through pathways 30 or 32). Examples of suitable dimensions for thickness 106 range from about 0.08 millimeters (about 0.003 inches) to about 1.5 millimeters (about 0.06 inches), with particularly suitable thicknesses ranging from about 0.38 millimeters (about 0.015 inches) to about 1.3 millimeters (about 0.05 inches), and with even more particularly suitable thicknesses ranging from about 0.51 millimeters (about 0.02 inches) to about 1.0 millimeters (about 0.04 inches).

Ribbon filament 44 also desirably has an aspect ratio of width 104 to thickness 106 that substantially corresponds to the aspect ratio of channel 72 at top end 48 when ribbon filament 42 is flexed for alignment with channel 72, as shown in FIG. 8B. Examples of suitable aspect ratios of width 104 to thickness 106 include aspect ratios of about 2:1 or greater, with particularly suitable aspect ratios ranging from about 2.5:1 to about 20:1, with even more particularly suitable aspect ratios ranging from about 3:1 to about 10:1, and with even more particularly suitable aspect ratios ranging from about 3:1 to about 8:1.

Ribbon filament 44 may be manufactured from a variety of extrudable modeling and support materials for respectively building 3D model 24 and support structure 26 (shown in FIG. 1). Suitable modeling materials for ribbon filament 44 include polymeric and metallic materials. In some embodiments, suitable modeling materials include materials having amorphous properties, such as thermoplastic materials, amorphous metallic materials, and combinations thereof. Examples of suitable thermoplastic materials for ribbon filament 34 include acrylonitrile-butadiene-styrene (ABS) copolymers, polycarbonates, polysulfones, polyethersulfones, polyphenylsulfones, polyetherimides, amorphous polyamides, modified variations thereof (e.g., ABS-M30 copolymers), polystyrene, and blends thereof. Examples of suitable amorphous metallic materials include those disclosed in U.S. Patent Application Publication No. 2009/0263585.

Suitable support materials for ribbon filament 44 include materials having amorphous properties (e.g., thermoplastic materials) and that are desirably removable from the corresponding modeling materials after 3D model 24 and support structure 26 are built. Examples of suitable support materials for ribbon filament 44 include water-soluble support materials commercially available under the trade designations "WATERWORKS" and "SOLUBLE SUPPORTS" from Stratasys, Inc., Eden Prairie, Minn.; break-away support materials commercially available under the trade designation "BASS" from Stratasys, Inc., Eden Prairie, Minn., and those disclosed in Crump et al., U.S. Pat. No. 5,503,785; Lombardi et al., U.S. Pat. Nos. 6,070,107 and 6,228,923; Priedeman et al., U.S. Pat. No. 6,790,403; and Hopkins et al., U.S. Patent Application Publication No. 2010/0096072.

The composition of ribbon filament 44 may also include additional additives, such as plasticizers, rheology modifiers, inert fillers, colorants, stabilizers, and combinations thereof. Examples of suitable additional plasticizers for use in the support material include dialkyl phthalates, cycloalkyl phthalates, benzyl and aryl phthalates, alkoxy phthalates, alkyl/aryl phosphates, polyglycol esters, adipate esters, citrate esters, esters of glycerin, and combinations thereof. Examples of suitable inert fillers include calcium carbonate, magnesium carbonate, glass spheres, graphite, carbon black, carbon fiber, glass fiber, talc, wollastonite, mica, alumina, silica, kaolin, silicon carbide, composite materials (e.g., spherical and filamentary composite materials), and combinations thereof. In embodiments in which the composition includes additional additives, examples of suitable combined concentrations of the additional additives in the composition range from about 1% by weight to about 10% by weight, with particularly suitable concentrations ranging from about 1% by weight to about 5% by weight, based on the entire weight of the composition.

Ribbon filament 44 also desirably exhibits physical properties that allow ribbon filament 44 to be used as a consumable material in system 10. In one embodiment, the composition of ribbon filament 44 is substantially homogenous along its length. Additionally, the composition of ribbon filament 44 desirably exhibits a glass transition temperature that is suitable for use in build chamber 12. Examples of suitable glass transition temperatures at atmospheric pressure for the composition of ribbon filament 44 include temperatures of about 80° C. or greater. In some embodiments, suitable glass transition temperatures include about 100° C. or greater. In additional embodiments, suitable glass transition temperatures include about 120° C. or greater.

Ribbon filament 44 also desirably exhibits low compressibility such that its axial compression doesn't cause ribbon filament 44 to be seized within a liquefier. Examples of suitable Young's modulus values for the polymeric compositions of ribbon filament 44 include modulus values of about 0.2 gigapascals (GPa) (about 30,000 pounds-per-square inch (psi)) or greater, where the Young's modulus values are measured pursuant to ASTM D638-08. In some embodiments, suitable Young's modulus range from about 1.0 GPa (about 145,000 psi) to about 5.0 GPa (about 725,000 psi). In additional embodiments, suitable Young's modulus values range from about 1.5 GPa (about 200,000 psi) to about 3.0 GPa (about 440,000 psi).

Additional examples of suitable ribbon filament for ribbon filament 44 and suitable techniques for manufacturing ribbon filament 44 include those disclosed in U.S. Provisional Patent Application No. 61/247,067; and U.S. Patent Application Publication No. 2011/0076496; and ribbon filaments having topographical surface patterns as disclosed in U.S. Provisional Patent Application No. 61/247,078; and U.S. Patent Application Publication No. 2011/0076495.

Figure 9:
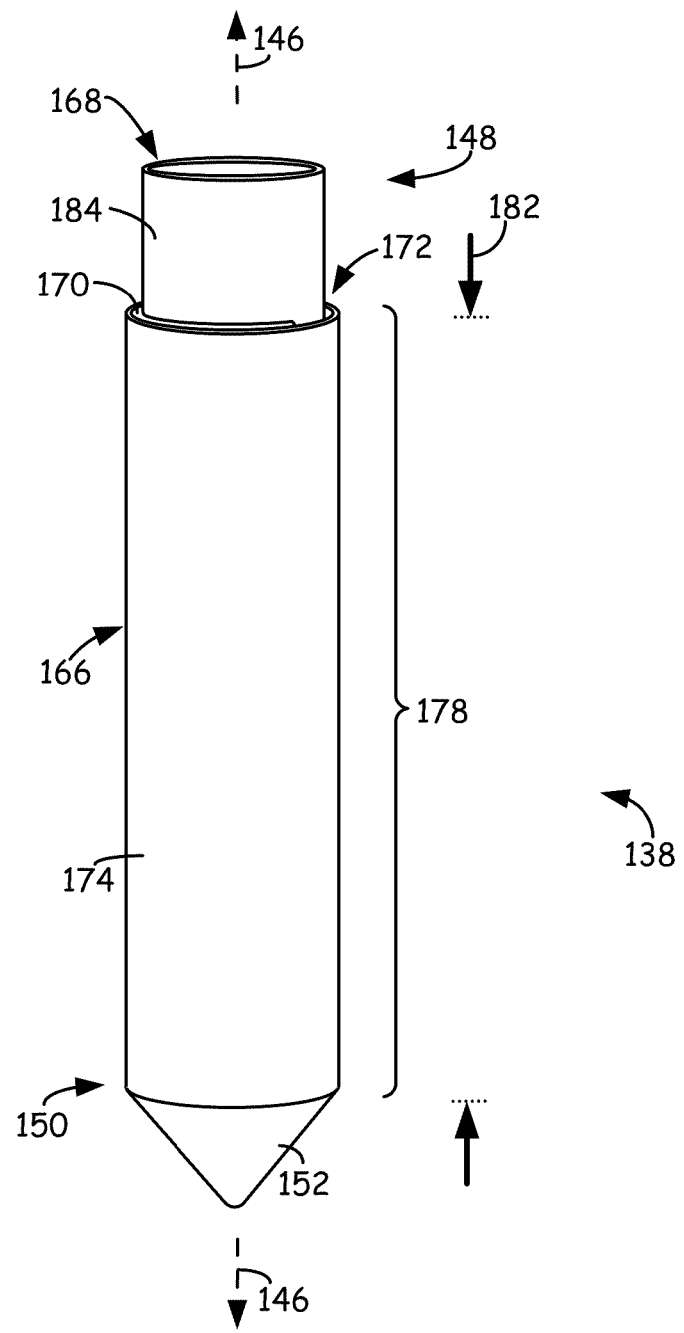
FIG. 9 is a perspective view of a first alternative ribbon liquefier, which includes an open-top arrangement.
Figure 10:
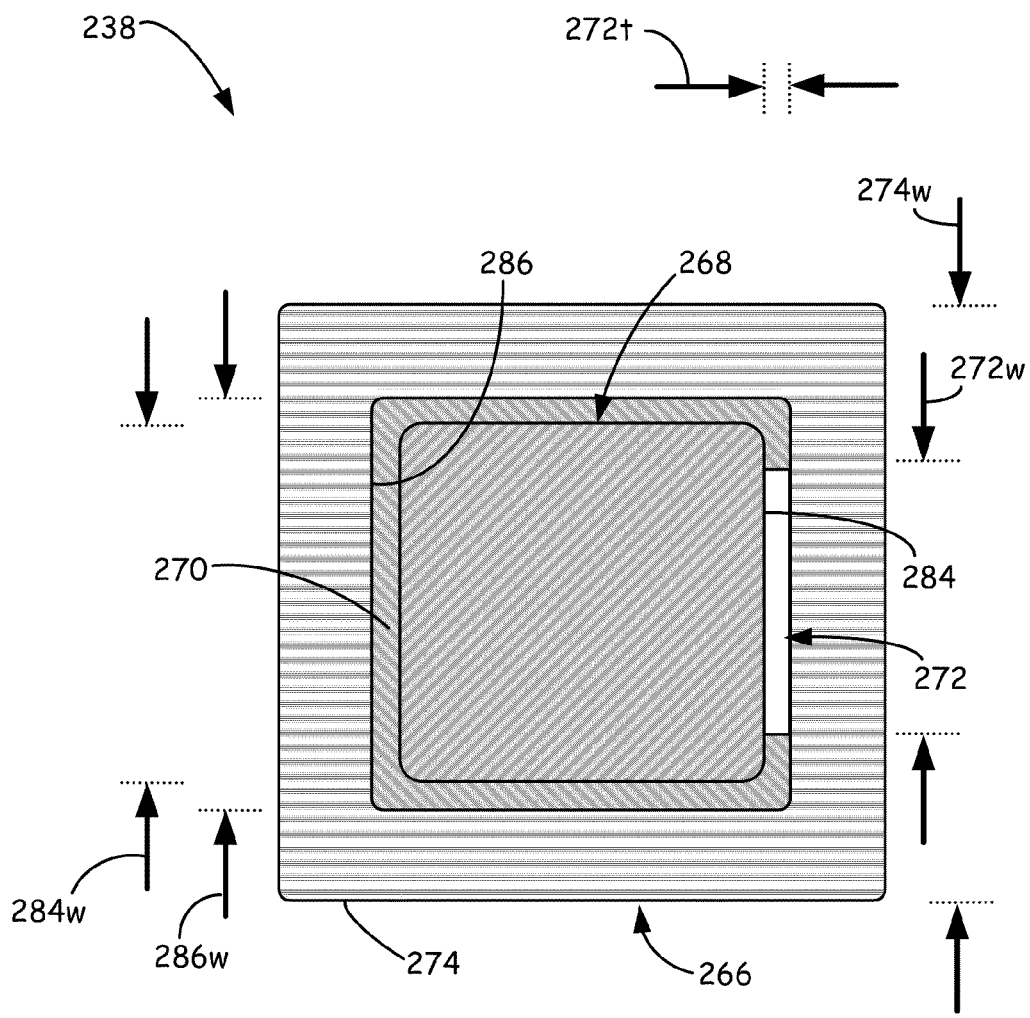
FIG. 10 is an alternative sectional view of section 4C-4C, illustrating a second alternative ribbon liquefier, which includes a non-arcuate channel for receiving a ribbon filament.

FIGS. 9 and 10 illustrate examples of suitable alternative ribbon liquefiers to ribbon liquefier 28 (shown in FIGS. 2-7), where the above-discussed embodiments are equally applicable to the following examples. As shown in FIG. 9, ribbon liquefier 138 is a first alternative to ribbon liquefier 38, where the corresponding reference labels are increased by "100". In this embodiment, the inlet region and port corresponding to inlet region 64 and port 76 are omitted. Instead, core tube 168 extends beyond outer tube 166 and shim component 170 at top end 148. In this embodiment, a drive mechanism (e.g., drive mechanism 42) may engage ribbon filament 44 at outer surface 184 of core tube 168, above channel 172. This allows the drive mechanism to drive successive portions of ribbon filament 44 into channel 172 while outer surface 184 functions as a lateral backing support for ribbon filament 44 in the same manner as discussed above for ribbon liquefier 38.

In the shown embodiment, suitable dimensions for heated length 178 to exist, between the entrance of channel 172 and bottom end 150 (referred to as length 182), may also vary depending on the heat transfer properties of thermal block 40 (shown in FIG. 2), the thickness and material of outer tube 166, and the thickness, material, and drive rate of ribbon filament 44. Examples of suitable lengths for length 182 include those discussed above for length 82 (shown in FIG. 3).

In an alternative embodiment, shim component 170 may also extend upward with core tube 168. In additional alternative embodiments, one or more of outer tube 166, core tube 168, and shim component 170 may include a strain gauge, as discussed in Batchelder et al., U.S. Patent Application Publication No. 2009/0273122. This is beneficial for monitoring the loads applied to outer tube 166, core tube 168, and/or shim component 170 during operation in system 10.

FIG. 10 is a sectional view of ribbon liquefier 238, which is an additional alternative to ribbon liquefier 38 (shown in FIGS. 2-7) and ribbon liquefier 138 (shown in FIG. 9). The sectional view corresponds to section 4A-4A taken in FIG. 3, and the corresponding reference labels are increased by "200". As shown, ribbon liquefier 238 includes outer tube 266, core portion 268, and shim component 270, which define channel 272, where channel 272 has a rectangular cross-section rather than an arcuate cross-section.

Suitable dimensions for outer tube 266, core portion 268, shim component 270, and channel 272 include those discussed above for the respective components of ribbon liquefier 38. For example, suitable average widths for exterior surface 274 (referred to as width 274*w*), exterior surface 284 (referred to as width 284*w*), and interior surface 286 (referred to as width 286*w*) include those discussed above for outer diameter 74*d*, outer diameter 84*d*, and inner diameter 86*d* (shown in FIG. 4A), respectively. The dimensions of outer tube 266, core portion 268, and shim component 270 may be substantially the same along the x-axis and the y-axis (i.e., a square cross-section as shown in FIG. 10), or may be different (e.g., rectangular) depending on the particular design of ribbon liquefier 238. Correspondingly, suitable widths for channel 272 (referred to as width 272*w*) include those discussed above for the arcuate width of channel 72, and suitable thicknesses for channel 272 (referred to as thickness 272*t*) include those discussed above for thickness 88 (shown in FIG. 4A).

In the shown embodiment, core portion 268 is filled rather than having a hollow bore region. This is beneficial for ensuring that core portion 268 can withstand the lateral stresses applied to outer surface 284 from a drive mechanism (e.g., drive mechanism 42, shown in FIG. 2) without buckling or deforming. In an alternative embodiment, core portion 268 may be a hollow core tube having a suitable wall thickness.

Ribbon liquefier 238 is an example of a suitable ribbon liquefier of the present disclosure that is configured to receive ribbon filament 44 in a relaxed, non-flexed state, as shown above in FIG. 8A. The dimensions of ribbon liquefier 238 and ribbon filament 44 also effectively remove the core that is associated with a cylindrical filament having a circular cross-section. This allows the ribbon liquefier 238 to also attain reduced response times compared to cylindrical liquefiers having the same volumetric flow rates.

Additionally, the dimensions of channel 272 are configured to conform the melt flow of the molten material of ribbon filament 44 to a rectangular-patterned flow, which is also an axially-asymmetric flow. Upon reaching extrusion tip 252 (not shown), however, this melt flow changes to a substantially axially-symmetric flow for extrusion in the same manner as discussed above for ribbon liquefier 38 in FIG. 5. This is also in contrast to a cylindrical liquefier, in which a melt flow remains as an axially-symmetric flow in the cylindrical liquefier and in the extrusion tip.

In additional embodiments of the present disclosure, the above-discussed cylindrical and non-cylindrical filaments may also be hollow. Since the cross-sectional area of the plastic is reduced by the missing core, the hydraulic diameter of the hollow filament may also be less than the physical diameter. Accordingly, examples of suitable hydraulic diameters for the hollow filaments of the present disclosure include those discussed above. Furthermore, the liquefier may also include a mating core to the hollow filament, so that the extrudate is heated from the inside as well as the outside.

One potential additional advantage of a hollow filament is that when hollow filament is manufactured by rapid extrusion from a compounder, it is desirably rapidly cooled before it is retained on a supply assembly (e.g., spooled). That rapid cooling process may induce diameter changes in an otherwise solid filament that may vary along its length. In comparison, if a hollow filament is rapidly cooled, the inner surface of the hollow filament can vary in diameter, leaving the outer surface more uniform.

Another potential additional advantage of a hollow filament in the form of a cylindrical shell is compliance with the filament drive mechanism. A solid filament may be close to incompressible, so that a drive roller or drive teeth may obtain too little or too much traction if the filament diameter is slightly small or large. A hollow filament, however, provides compliance so that small variations in the filament diameter are compensated by variations in the amount of compression of the hollow filament.

Yet another potential additional advantage of a hollow filament is the reduced thermal conduction in the inlet of the liquefier. When a solid filament is stationary, heat may slowly conduct up the center of the filament to the zone above the heated portion of the liquefier where the walls are relatively cool. If the filament melts there, it tends to solidify against the cooler wall, potentially causing a large axial force to restart filament motion. The rate of heat conduction up a hollow filament, however, will be slower than the rate of conduction up a solid filament due to the lack of a core.

Although the present disclosure has been described with reference to preferred embodiments, workers skilled in the art will recognize that changes may be made in form and detail without departing from the spirit and scope of the disclosure.

The invention claimed is:

1. A ribbon liquefier for use in an extrusion-based digital manufacturing system, the ribbon liquefier comprising:
   an outer liquefier portion configured to receive thermal energy from a heat transfer component;
   a static channel at least partially defined by the outer liquefier portion, the static channel having an inlet end with dimensions that are configured to receive a ribbon filament, and an outlet end, wherein the ribbon liquefier is configured to melt the ribbon filament received in the static channel to at least an extrudable state with the received thermal energy to provide a melt flow, and wherein the dimensions of the channel are further configured to conform the melt flow to an axially-asymmetric flow within the static channel; and
   an extrusion tip extending from the outer liquefier portion at the outlet end of the static channel, wherein the dimensions of the extrusion tip are configured to conform the melt flow from the axially-asymmetric flow in the static channel to a substantially axially-symmetric flow for extrusion from the extrusion tip.

2. The ribbon liquefier of claim 1, wherein the dimensions of the static channel define an arcuate cross-section.

3. The ribbon liquefier of claim 1, wherein the dimensions of the static channel define a cross section having a width and a thickness, wherein an aspect ratio of the width to the thickness is about 2:1 or greater.

4. The ribbon liquefier of claim 3, wherein aspect ratio of the width to the thickness ranges from 2.5:1 to about 20:1.

5. The ribbon liquefier of claim 1, wherein the outlet end of the static channel is opposite of the inlet end of the static channel along an axis.

6. The ribbon liquefier of claim 1, and further comprising a fixed core portion disposed within the outer liquefier portion and also partially defining the static channel, the fixed core portion being configured to provide backing support to the ribbon filament when a filament drive mechanism is engaged with the ribbon filament.

7. The ribbon liquefier of claim 6, and further comprising a fixed shim component disposed between the outer liquefier portion and the fixed core portion, the fixed shim component defining a gap that further defines the static channel.

8. An extrusion head subassembly for use in an extrusion-based digital manufacturing system, the extrusion head subassembly comprising:
   a ribbon liquefier comprising:
      an inlet region;
      a heatable region extending from the inlet region;
      a static channel extending through the inlet region and the heatable region, the static channel comprising:
         an arcuate cross section;
         an inlet end at the inlet region that is configured to receive a ribbon filament; and
         an outlet end at the heatable region; and
      an extrusion tip extending from the heatable region at the outlet end of the static channel, the extrusion-tip having a substantially-circular inner-diameter cross section; and
   a heat transfer component coupled to the heatable region of the ribbon liquefier and configured to transfer thermal energy to the heatable region to melt the received ribbon filament in the heatable region to provide a melt flow that conforms from an axially-asymmetric flow in the static channel to a substantially axially-symmetric flow in the extrusion tip.

9. The extrusion head subassembly of claim 8, wherein the ribbon liquefier further comprises:
   an outer tube having an exterior surface and an interior surface, wherein the exterior surface of the outer tube is configured to engage with the heat transfer component;
   a fixed core portion disposed within the outer tube and having an exterior surface; and
   a fixed shim component disposed between the outer tube and the fixed core portion, wherein the fixed shim component having a gap that extends along a longitudinal length of the fixed shim component, and wherein the gap defines the static channel between the interior surface of the outer tube and the exterior surface of the fixed core portion.

10. The extrusion head subassembly of claim 8, wherein the arcuate cross section has an arcuate width that extends at an angle from a radially-concentric point, wherein the angle ranges from about 30 degrees to about 180 degrees.

11. The extrusion head subassembly of claim 10, wherein the angle ranges from about 45 degrees to about 130 degrees.

12. The extrusion head subassembly of claim 8, wherein the fixed core portion comprises a fixed core tube.

13. The extrusion head subassembly of claim 8, and further comprising a fluorinated polymer at an inner surface of the static channel within the inlet region of the ribbon liquefier.

14. The extrusion head subassembly of claim 8, wherein the heatable region extends from the inlet region along an axis, and wherein the outlet end of the static channel is opposite of the inlet end of the static channel along the axis.

15. An extrusion head subassembly for use in an extrusion-based digital manufacturing system, the extrusion head subassembly comprising:
   a ribbon liquefier comprising:
      an inlet region;
      a heatable region extending from the inlet region;
      a static channel extending through the inlet region and the heatable region, the static channel comprising:
         a substantially-rectangular cross section;
         an inlet end at the inlet region that is configured to receive a ribbon filament of a material; and
         an outlet end at the heatable region; and
      an extrusion tip extending from the heatable region at the outlet end of the static channel, the extrusion-tip having a substantially-circular inner-diameter cross section; and
   a heat transfer component coupled to the heatable region of the ribbon liquefier and configured to transfer thermal energy to the heatable region;
   wherein the heatable region of the ribbon liquefier is configured to transfer the thermal energy received from the heat transfer component to the received ribbon filament in the heatable region in a manner such that at least about 60% of the thermal energy diffuses through the ribbon filament in one cross-sectional dimension of the ribbon filament to provide a melt flow of the ribbon filament material that conforms from an axially-asymmetric flow in the static channel to a substantially axially-symmetric flow in the extrusion tip.

16. The extrusion head subassembly of claim 15, wherein the manner in which the heatable region of the ribbon liquefier is configured to transfer the thermal energy to the received ribbon filament in the heatable region is such that at least about 65% of the thermal energy diffuses through the ribbon filament in the one cross-sectional dimension of the ribbon filament.

17. The extrusion head subassembly of claim 16, wherein the heatable region extends from the inlet region along an axis, and wherein the outlet end of the static channel is opposite of the inlet end of the static channel along the axis.

18. The extrusion head subassembly of claim 15, wherein the substantially rectangular cross section of the has a width and a thickness in the heatable region, wherein an aspect ratio of the width to the thickness in the heatable region is about 2:1 or greater.

19. The extrusion head subassembly of claim 18, wherein aspect ratio of the width to the thickness in the heatable region ranges from 3:1 to about 10:1.

20. The extrusion head subassembly of claim 15, and further comprising a fluorinated polymer at an inner surface of the static channel within the inlet region of the ribbon liquefier.

* * * * *